United States Patent
Rosen

[19]

[11] Patent Number: 6,007,596

[45] Date of Patent: Dec. 28, 1999

[54] ADJUSTABLE AIR FILTER KIT

[76] Inventor: Richard M. Rosen, 5730 NW. 60th Pl., Parkland, Fla. 33067

[21] Appl. No.: 08/743,310

[22] Filed: Nov. 5, 1996

[51] Int. Cl.$^6$ .................................................... B01D 39/08
[52] U.S. Cl. ................................ 55/491; 55/496; 55/502; 55/511; 55/524; 55/DIG. 31
[58] Field of Search ..................... 55/496, 511, DIG. 31, 55/491, 502, 279, 524

[56] References Cited

U.S. PATENT DOCUMENTS

| | | | |
|---|---|---|---|
| 3,127,259 | 3/1964 | Boylan | 55/496 |
| 3,675,402 | 7/1972 | Weed | 55/496 |
| 3,767,260 | 10/1973 | Limpach | 297/417 |
| 5,188,646 | 2/1993 | Nolen, Jr. | 55/496 |
| 5,230,799 | 7/1993 | Willard et al. | 55/511 |
| 5,255,479 | 10/1993 | Shepherd | 52/127.8 |
| 5,364,458 | 11/1994 | Burnett et al. | 55/496 |
| 5,421,862 | 6/1995 | Davis | 95/273 |
| 5,476,526 | 12/1995 | Attermeyer | 55/496 |
| 5,525,136 | 6/1996 | Rosen | 55/DIG. 31 |

*Primary Examiner*—Jay H. Woo
*Assistant Examiner*—Robert A. Hopkins
*Attorney, Agent, or Firm*—Malin, Haley, DiMaggio & Crosby, PA

[57] ABSTRACT

An air filter kit for residential and light commercial air filtration applications including a user assembled, dimensionally adjustable, air filter frame assembly capable of telescopic adjustment of both length and width. Telescopic adjustment is facilitated by a plurality of slidably engaged frame members which together form an adjustable peripheral filter frame defining a recessed channel for receiving a quantity of filter media therein. Adjustment of the frame members is further facilitated by the use of a lubricating substance such as a friction reducing synthetic tape between the members. A quantity of spongy filter media is secured cut to size and secured within the recessed channel by a quantity of hook material projecting into the filter media. A perimeter gasket anchors the frame dimensions while providing a positive seal between the frame and a filter track.

4 Claims, 2 Drawing Sheets

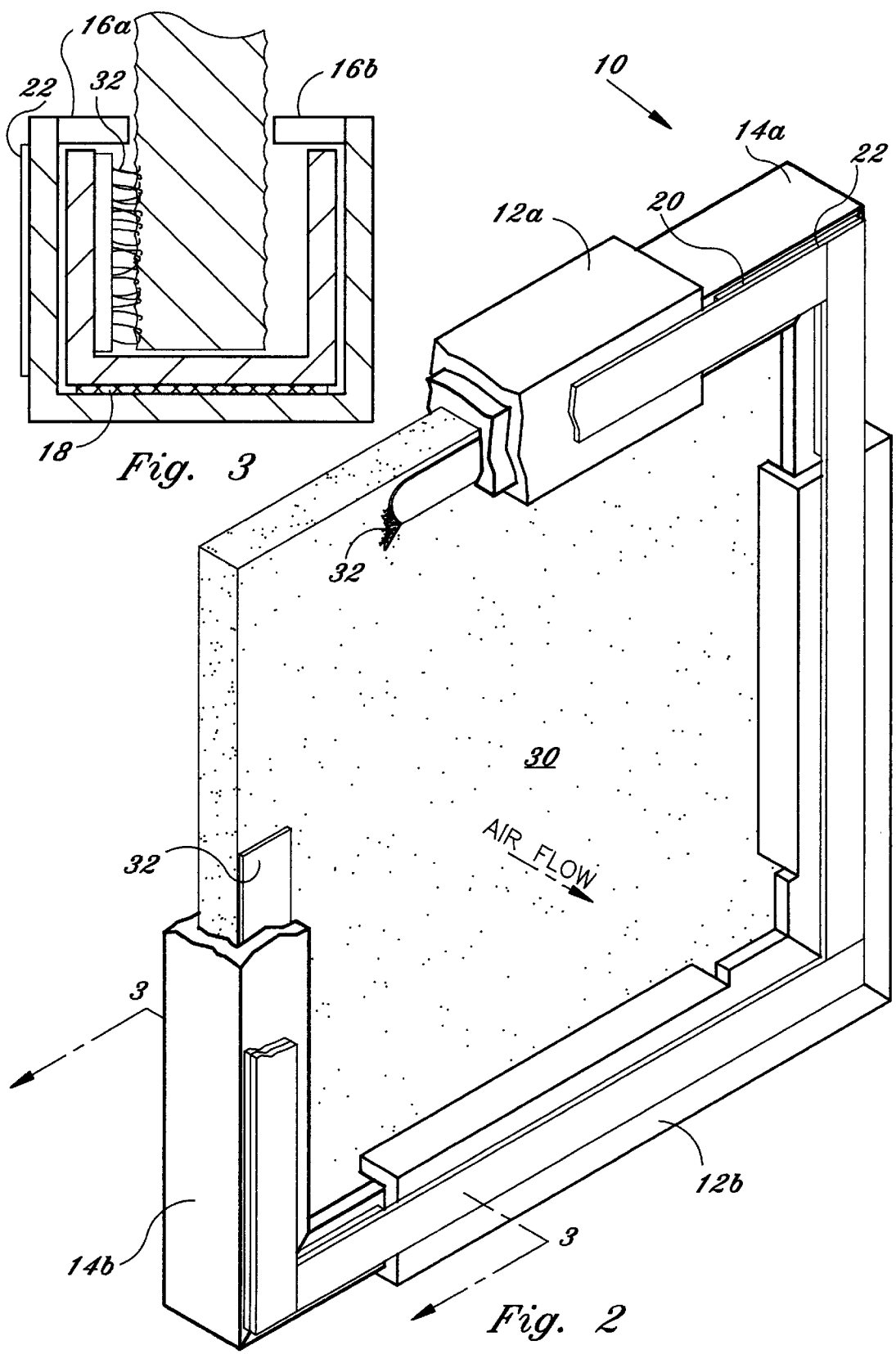

ADJUSTABLE AIR FILTER KIT

BACKGROUND OF THE INVENTION

1. Field of the Invention

This invention relates to air filtration, and more particularly to a universal air filter kit having a telescopically adjustable gasketed frame for residential and light commercial applications.

2. Description of the Prior Art

The use of air filters to remove particulates from an air stream is well known in the art. Air filtration is primarily used in both commercial and residential heating, ventilating, and air conditioning systems for removing atmospheric dust, or other undesirable airborne matter.

Atmospheric dust comprises a complex mixture of smoke, fumes, dry granular particles, and fibers. These components and their concentrations vary with the geography of the locality (urban or rural), the season of the year, weather, the direction and strength of the wind, and the proximity of dust sources. A sample of atmospheric dust usually contains soot and smoke, silica, clay, decayed animal and vegetable matter, organic materials in the form of lint and plant fibers, and metallic fragments. It may also contain living organisms, such as mold spores, bacteria, and plant pollens, which may cause diseases or allergic responses.

Particles in the atmosphere range in size from less than 0.01 pica meters to the dimensions of lint, leaves, and insects. Particulate contamination indoors in influenced by smoking, human sources, human activities, and other sources such as equipment, furnishings and pets.

Different filtration applications require different degrees of air filtration. In industrial ventilation, it may only be necessary to remove the coarser dust particles from the airstream in order to insure the protection of mechanical equipment and cleanliness of the structure. A residential application, on the other hand, may require removal of even finer dust particles, often the worst offenders of home interior discoloration and indoor air quality problems. Electronic air cleaners or high efficiency media filters may be required for small particle removal, specifically the respirable fraction, which often just be controlled for health reasons.

The characteristics of airborne contaminants most affecting the performance of an air filter include particle specific gravity, concentration, electrical properties, and most importantly, size. Thus, the degree of air cleanliness required and contaminant concentration are major factors influencing filter design and selection.

Three operating characteristics distinguish the various types of air filters: efficiency, airflow resistance, and dust holding capacity. Efficiency measures the ability of an air filter to remove particulate matter from an airstream. Airflow resistance is the static pressure drop across the filter at a given airflow rate. Dust holding capacity defines the amount of a particular type of dust that an air cleaner can hold when it is operated at a specified airflow rate to some maximum resistance value or before its efficiency drops seriously as a result of the collected dust. Complete evaluation of an air filter thus requires data on all of the aforementioned factors.

The American Society of Heating, Refrigerating and Air Conditioning Engineers (ASHRAE) has developed testing methods for determining air filter efficiency that have become standard in general ventilation applications in the United States. These testing techniques have been unified into a single test procedure, ASHRAE Standard 52–76, recently renamed as ASHRAE Standard 52.1–1992. In this procedure a known amount of standardized test dust is fed into a test filter at a known and controlled rate. The concentration of dust in the air leaving the filter is determined by then passing the entire airflow through a high efficiency after-filter and measuring the gain in filter weight, In the ASHRAE Standard 52.1–1992, Dust Holding Capacity Test, the same test dust is fed to the filter, and the pressure drop across the filter rises as dust is collected by the filter. The test is terminated when the pressure drop across the filter reaches the maximum operating resistance set by the manufacturer.

A variety of filter configurations known in the art are routinely tested and rated according to ASHRAE Standard 52.1-1992. Among these types of filters are panel filters, renewable media filters, and electronic or electrostatic air cleaners. Panel filters consist of viscous impingement filters and conventional dry type filters. Viscous impingement filters are panel filters where the filter media is coated with a viscous substance, such as oil, which adheres to particles that impinge on the fibers. Renewable media filters are found exclusively in commercial and industrial applications; while dry-type panel filters and to a lesser extent electronic air cleaners are primarily used in residential applications.

A common problem in the filtration industry relates to filter size requirements. Typically, air filters are mounted in a filter track. However, filter tracks of various sizes are used for mounting filters in a ducted air stream, or in an air handling apparatus. For example, common filter track dimensions include 12"×20", 12"×24", and 18"×24". Furthermore, a wide variety of "non-standard" filter track dimensions are found in association with various systems. Accordingly, for any given filter track, it is important that the proper filter size be obtained and installed. If the filter is too large for a given track, installation may prove impossible without modifying either the filter, or the track, or both. On the other hand, if the filter is too small for a given track, large quantities of air may simply by-pass the filter.

U.S. Pat. No. 3,675,402, issued to Weed, discloses an adjustable filter assembly for a filter or the like which is telescopically adjustable in two different directions. The device disclosed by Weed, however, is designed for use in apertures of buildings such as windows or doors, and is not suitable for use as an adjustable filter frame in a ducted airstream. An example of one such disadvantage stems from Weed's failure to provide means for sealing the frame relative to the surrounding support structure for maintaining an seal around the filter.

Furthermore, most conventional air filter assemblies comprise a quantity of filter media having a light weight frame often made of cardboard. Since the media is often not securely fastened to the surrounding frame, a support grid or wire mesh is used on the leaving air side of the media to aid in supporting the media within when placed in a moving air stream. However, the support grid necessarily reduces the net free area of the filter effectively reducing the face area of the filter. As a result, the velocity of air flowing through the filter media increases, due to the effective reduction in free area, thereby decreasing filter performance and increasing the pressure drop across the filter. In addition, cardboard filter frames fail to provide a positive perimeter seal thereby allowing a substantial quantity of the airstream to by-pass the filter entirely.

Accordingly, there exists a need for a kit, for residential and light commercial use, having a telescopically adjustable filter frame capable of independent length and width adjustment, and which provides means for maintaining a positive perimeter seal when installed in a filter track. Such a kit would enable a user to adjust the frame to the size required to fit the user's filter track, and install a quantity of filter media therein without requiring the use of a net free area reducing support grid.

It is to providing this, and other, needs that the instant invention is directed.

SUMMARY OF THE INVENTION

An air filter kit for residential and light commercial air filtration applications comprising a dimensionally adjustable air filter frame assembly having means for telescopic adjustment of both length and width. The means for telescopic adjustment includes a plurality of slidably engaged frame members which together form an adjustable peripheral filter frame defining a slot for receiving a quantity of filter media therein. Adjustment of the frame members is further facilitated by the use of a lubricating means such as a friction reducing synthetic tape between the members.

The kit further includes means for anchoring the members once adjusted to the proper size for the particular application. The means for anchoring may include a quantity of adhesively secured sealing material attached about the periphery of the frame leaving air side. Such material may be attached by the user after the frame is adjusted to the proper length and width thereby functioning to secure the frame size while providing means for providing a positive seal between the frame perimeter and the filter mounting track when the frame is installed within the track. Accordingly, the frame assembly is individually adjustable by the user in both length and width for mounting for adjustment to the exact size required for a particular air filter track.

The adjustable frame defines a means for securely mounting filter media therein thereby eliminating the need for a support grid or wire mesh backing support. In the preferred embodiment the kit includes a quantity of filter media which may be cut by the user to a suitable size for installation into the frame mounting means. The media may comprise a spongy pad of material that has been treated with an antimicrobial chemical for the purpose of treating or eliminating airborne bacteria and the like. In addition, the media may be coated with a tacky substance for increasing the filter's particulate loading efficiency. Once cut to size the filter media is installed within the frame by insertion of the media edges into the peripheral slot or channel defined by the frame and fixed in place by a quantity of hook material existing within the channel. The hook material is positioned within the channel on the leaving air side and secures the media by fastening the media peripheral edge to the frame by engaging the spongy media (e.g. hook and loop fastening).

Accordingly, the instant invention provides a universal filtration kit for allowing a residential or commercial user to obtain a properly sized, gasketed, air filter without requiring the user to know the exact specifications of the user's filter track prior to purchasing the kit. The kit further eliminates the need for a support grid thereby maximizing the filter's face area.

Accordingly, it is an object of the present invention to provide a universal air filter kit for residential and commercial users.

It is another object of the present invention to provide a universal air filter kit having an adjustable frame for use with any conventional filter track.

Yet another object of the present invention is to provide a universal air filter kit which includes an adjustable frame, filter media, and gasket material, for allowing a user to quickly and easily assemble a high quality air filter which exactly fits a particular filter track.

In accordance with these and other objects which will become apparent hereinafter, the instant invention will now be described with particular reference to the accompanying drawings.

BRIEF DESCRIPTION OF THE DRAWINGS

The instant invention is further disclosed in the attached drawings wherein:

FIG. 2 shows a partially cutaway perspective view of a fully assembled filter;

FIG. 3 shows a sectional view of the frame assembly.

DESCRIPTION OF THE PREFERRED EMBODIMENTS

Figure 1:
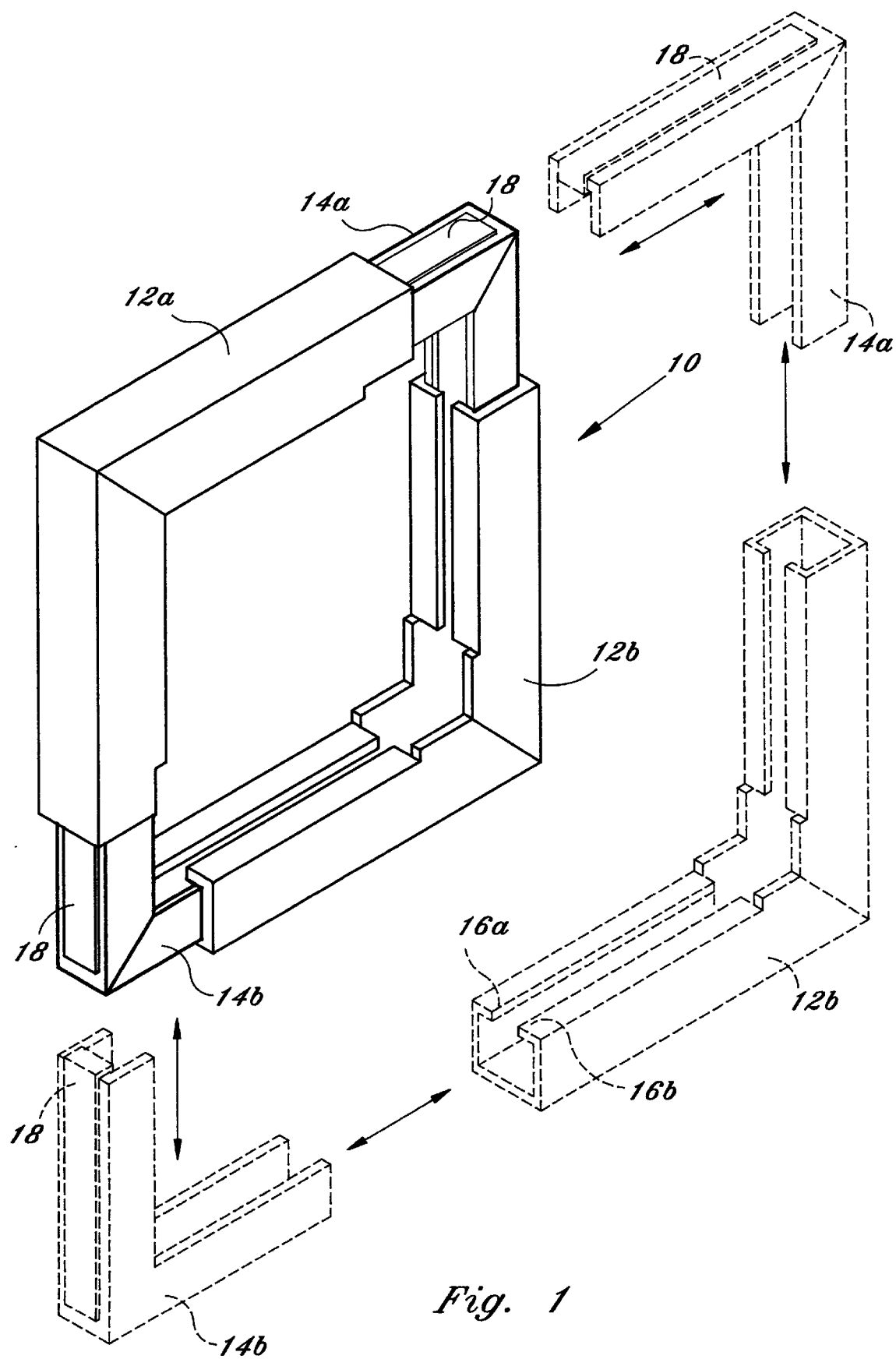
FIG. 1 shows an assembled view of the adjustable frame with individual frame members exploded in phantom.

With reference now to the drawings FIG. 1 shows an embodiment of the adjustable frame assembly of the instant invention, generally referenced as 10. The frame assembly includes individual frame members 12a and 12b, and 14a and 14b, which cooperate when joined to form a telescopically adjustable frame. In the preferred embodiment frame members 12a, 12b, 14a, and 14b, are fabricated from metal, however, any suitable material is within the scope of the invention. Frame members 12a and 12b each comprise a generally L-shaped member having a pair of generally perpendicular legs, each leg having a generally U-shaped cross section including retaining flanges 16a and 16b as best depicted in FIG. 3. Frame members 14a and 14b also comprise generally L-shaped members having a pair of generally perpendicular legs, each leg having a generally U-shaped cross section. Frame members 14a and 14b are sized for mating insertion within each of frame members 12a and 12b respectively as depicted in FIG. 1, whereby members 14a and 14b are inserted within members 12a and 12b and guided and retained by flanges 16a and 16b. In the preferred embodiment strips of friction reducing adhesively secured material 18 are secured to members 14a and 14b for the purpose of facilitating the sliding of members 14 relative to members 12. Such material 18 may include teflon® or any suitable lubricating substance.

As is now apparent, frame members 12a and 12b, and 14a and 14b, cooperate to form a telescopically adjustable filter frame. For example, with reference to FIG. 1, telescopic adjustment is accomplished by sliding members 12a and 12b apart or together as is desirable. Turning now to FIG. 2, there is depicted means for anchoring the frame members relative to each other, which means for anchoring includes adhesively secured material 20 and 22. In the preferred embodiment, once frame members 12a-b and 14a-b are positionally adjusted to the desired length and width, a quantity of adhesively secured material 20 is applied on what will become the leaving air side of frame members 14a and 14b. Adhesively secured material 20 may comprise a foam tape and functions to provide a mounting surface on members 14a and 14b which is flush with the leaving air side surface of members 12a and 12b. Once material 20 is in place, gasket material 22 is then secured about the leaving air side of the frame as best depicted in FIG. 2. Gasket material 22 provides a positive seal between the frame members 12a, 12b, 14a and 14b, and the filter track (not shown) upon installation. It is important to note that gasket material 22 is affixed to the leaving air side of frame members 12 and 14, such that, upon installation in a moving airstream, the air flow and resulting pressure drop across the filter assists in maintaining the seal by forcing the frame against the filter track thereby sandwiching the gasket material between the frame and the track.

The kit of the present invention further includes a quantity of filter media material 30. In the preferred embodiment, filter media material 30 comprises a spongy particulate filter which may be easily cut to a predetermined size by the user, which size is determined by the filter track and more specifically the length and width of the filter frame. The filter material may be treated with an anti-microbial substance to kill, eliminate, or otherwise treat airborne bacteria and the like.

Accordingly, the user cuts the media with scissors or the like, to the appropriate size. The cut media 30 is then inserted within the frame such that the media edges are received within the U-shaped channel defined by frame as best depicted in FIG. 3. Frame members 14a and 14b further include strips of adhesively secured hook material 32 on the leaving air side, as best seen in FIG. 3. Hook material 32 engages media 30 thereby securing the media within the frame. The use of hook material 30 housed within the frame members, and, therefore, out of the moving airstream, eliminates the need for a supporting mesh or grid as is found on conventional filters. Since the use of a supporting mesh on the leaving air side of conventional filters effectively reduces the net free filter face area, the elimination thereof results in a maximization of the filter face area thereby effectively increasing filtration capacity for a given filter size.

Once the filter kit of the present invention is fully assembled by the user, the filter is installed within a filter track in a ducted airstream or air handling unit for removing airborne particulates and the like. An additional benefit is realized by the instant invention in that the user is able to periodically change the filter media 30 by (1) removing the filter assembly 10 from its track; (2) removing the media; and, (3) installing fresh media cut to size. Accordingly, once assembled the frame is reusable for the life of the air conditioning system.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An air filtration kit for residential and commercial air filtration applications wherein a filter track is provided for receiving an air filter, said kit including:

(a) a user adjustable filter frame assembly defining a filter frame having an adjustable length and an adjustable width, said filter frame assembly having a leaving air side and having a recessed peripheral channel defining a filter face area opening, said filter frame assembly including a first pair of generally L-shaped frame members and a second pair of generally L-shaped frame members, each of said L-shaped frame members having a first leg portion, a second leg portion, and a corner portion connecting said first and second leg portions, each of said L-shaped member legs defining a generally U-shaped cross section, the legs of said first pair of L-shaped members each defining a U-shaped cross section sized for receiving a leg from each of said second pair of L-shaped members slidably therein, whereby said L-shaped members are slidably joined to form a filter frame in the shape of a parallelogram and having a telescopically adjustable length and width, said filter frame having a peripheral recessed channel defining a filter face area;

(b) said second pair of L-shaped frame members each having a quantity of friction reducing material attached to said first and second legs, said friction reducing material disposed between the legs of said second pair of frame members and the legs of said first pair of frame members thereby facilitating the sliding of said first and second pairs of frame members;

(c) an air filter media disposed within said frame and occupying said filter face area, said filter media having a peripheral edge disposed within said recessed channel;

(d) at least one strip of hook material attached to said frame within said recessed channel for engaging and securing said filter edge to said frame; and (e) a gasket attached to said frame leaving air sides, after said frame has been telescopically adjusted to a length and width corresponding to the length and width of the filter track which will receive the filter frame, for providing a positive seal between said frame assembly and a filter track, said gasket including a first layer of gasket material attached to the legs of said second pair of L-shaped members such that said first layer of gasket material forms a uniform layer on each of said second pair of L-shaped members, said first layer of gasket material having end portions terminating substantially adjacent to each of said first pair of L-shaped members, and a second layer of gasket material overlapping said first layer and said first and second pair of L-shaped members such that said second layer of gasket material forms a positive seal between the filter frame and the filter track.

2. An air filtration kit according to claim 1, wherein said gasket means is attached to said frame leaving air side.

3. An air filtration kit according to claim 1, wherein said filter media comprises a spongy material treated with a chemical substance, whereby said chemical substance is anti-microbial.

4. An air filtration kit according to claim 1, wherein said at least one strip of hook material is adhesively secured to one of said second frame member legs within said recessed channel, said hook material engaging a portion of said filter media received within said channel thereby securing said filter media within said frame.

* * * * *